United States Patent [19]
Fuchs et al.

[11] Patent Number: 5,645,791
[45] Date of Patent: Jul. 8, 1997

[54] CHARGE PREHEATER

[75] Inventors: Gerhard Fuchs, Kehl-Bodersweiler; Joachim Ehle, Lautenbach; Klaus von Ploetz, Offenburg, all of Germany

[73] Assignee: Fuchs Systemtechnik GmbH, Willstatt-Legelshurst, Germany

[21] Appl. No.: 507,270

[22] PCT Filed: Jul. 21, 1994

[86] PCT No.: PCT/EP94/02405

§ 371 Date: Aug. 21, 1995

§ 102(e) Date: Aug. 21, 1995

[87] PCT Pub. No.: WO95/04910

PCT Pub. Date: Feb. 16, 1995

[30] Foreign Application Priority Data

Aug. 5, 1993 [DE] Germany .................. 43 26 369.0

[51] Int. Cl.$^6$ ................................................. C21B 7/00
[52] U.S. Cl. ...................................... 266/175; 266/200
[58] Field of Search ........................... 266/175, 200, 266/144; 373/80; 75/414

[56] References Cited

U.S. PATENT DOCUMENTS

| | | |
|---|---|---|
| 3,379,424 | 4/1968 | Dellagnese et al. |
| 3,379,425 | 4/1968 | Dellagnese et al. |
| 4,547,099 | 10/1985 | Alexandrov et al. ............ 406/149 |
| 4,852,858 | 8/1989 | Weber ............................ 266/175 |
| 5,153,894 | 10/1992 | Ehle et al. ...................... 373/80 |
| 5,201,941 | 4/1993 | Wells ............................. 75/414 |

FOREIGN PATENT DOCUMENTS

| | | |
|---|---|---|
| 0187565 | 7/1986 | European Pat. Off. . |
| 356290 | 2/1990 | European Pat. Off. . |
| 622757 | of 1935 | Germany . |
| 1161510 | 8/1969 | United Kingdom . |
| 1278623 | 6/1972 | United Kingdom . |
| 1455601 | 11/1976 | United Kingdom . |
| 2183316 | 6/1987 | United Kingdom . |

OTHER PUBLICATIONS

International Search Report for PCT/EP 94/02405 Dec. 28, 1994.

*Primary Examiner*—Scott Kastler
*Attorney, Agent, or Firm*—Lahive & Cockfield, LLP

[57] ABSTRACT

In a charging material preheater for a metallurgical smelting plant having a shaft (5) which has closure members (7, 8) which are pivotable by a control member (6) and which include fingers (9, 10) which are arranged parallel and at a spacing relative to each other, the fingers (9, 10) of a closure member (7, 8) are mounted with a central portion in a first rotary mounting (12, 13) and in a second rotary mounting (21, 22) of the frame structure (2) with an outer portion which is passed outwardly through an opening (14, 15) in the shaft wall, by way of an elbow lever mechanism (16, 17), and lever arms (18, 19) of at least two elbow lever mechanisms are connected together by a connecting member (23) which is pivotably engaged by a control member (6) which is supported in a third rotary mounting (26, 27) of the frame structure (2).

13 Claims, 3 Drawing Sheets

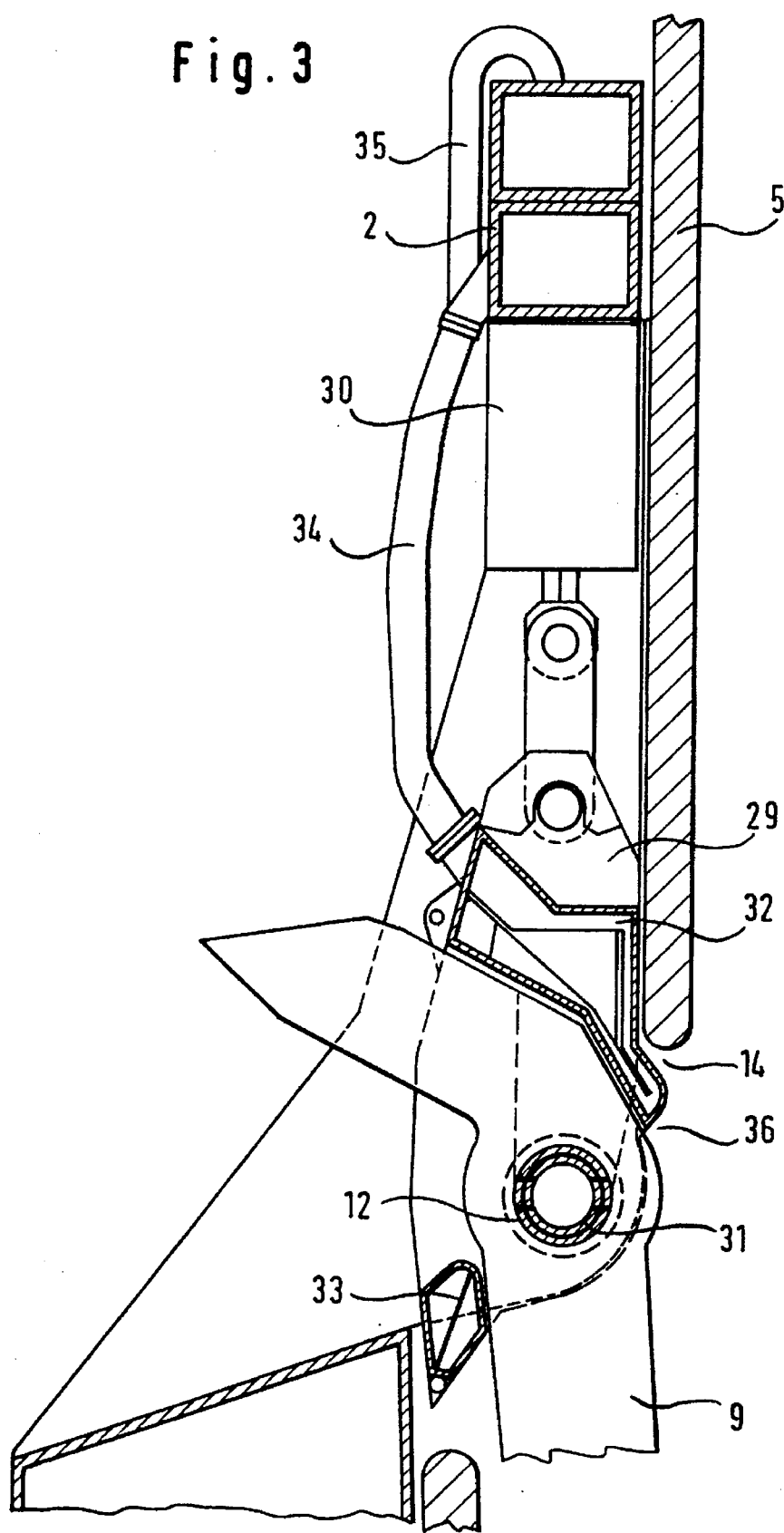

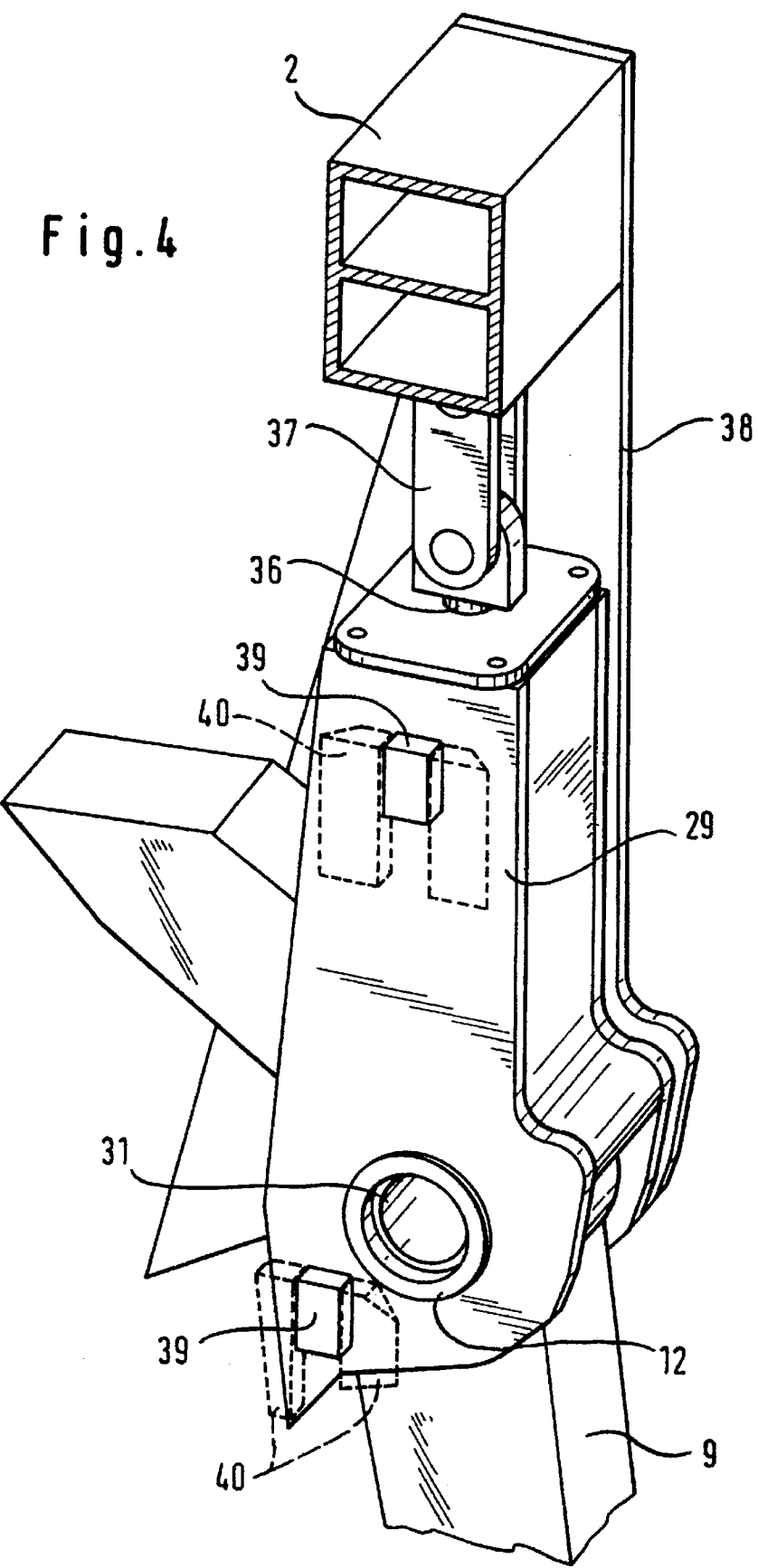

CHARGE PREHEATER

FIELD OF THE INVENTION

The invention concerns a charging material preheater for preheating charging material for a metallurgical smelting plant.

DESCRIPTION OF THE PRIOR ART

A charging material preheater similar to that disclosed herein is known from DE-A1-39 40 558. In the lower region of a shaft-like container the known charging material preheater has mutually oppositely disposed closure members which are pivotable by a control member and which each include fingers or grid bars which are arranged in parallel spaced relationship to each other, the fingers or grid bars being mounted in a mounting which is supported on a frame structure of the container and being pivotable downwardly from a closed position in which inner portions of the fingers project into the interior of the container into a release position in which said portions of the fingers face downwardly and permit material to pass through the container.

With that charging material preheater, when the closure members are in the closed position, it is possible for charging material to be retained in the container and heated by hot gases which are passed therethrough, while after the heating operation, the charging material can be emptied into a metallurgical vessel disposed therebeneath by pivotal movement of the closure members into the release position.

In the known charging material preheater the shaft-like container is of a rectangular cross-section.

EP-B1-0 291 701 discloses a charging material preheater having a shaft-like container which is fixed in a frame structure and which in the lower region has mutually oppositely disposed closure members which are pivotable by a control member and which each include grid bars arranged in parallel spaced relationship with each other, the grid bars being mounted in a first rotary mounting which is supported on the frame structure, wherein the grid bars are mounted in the carrier beam member rotatably about a horizontal axis and elastic supports are associated with the grid bars at the points of entry into the container.

By virtue of that configuration of a charging material preheater, it is possible on the one hand to control the severe shock loadings when charging material is introduced into the container, insofar as such loadings are carried by elastic supports and transmitted into the frame structure of the container, while in addition by virtue of the individual mounting of the grid bars in the carrier beam, it is possible to replace a damaged grid bar without operation of the charging material preheater having to be interrupted for that operation.

SUMMARY OF THE INVENTION

In the case of the charging material preheater of the kind set forth in the opening part of this specification, the grid bars or fingers of each closure member are in the form of cantilevered carriers, which are clamped in position at the end, of a rotatable drum mounted in a mounting which is supported on the frame structure of the container. Particularly in the case of high shaft-like containers, that results in a heavy mechanical loading on the rotary mounting and control members if for example heavy scrap drops on to the fingers from a height of 4 meters. Even if the mounting is fixed in the frame structure, with the incorporation of shock absorbers, it is not possible to guarantee the desired service life, in relation to shock loadings of that kind.

In a charging material preheater of the kind set forth in the opening part of this specification, the object of the invention is to pass the shock forces which act on the closure members when charging material is introduced directly into the frame structure without thereby loading control members. The invention also aims to reduce the loading on the rotary mountings of the fingers in the frame structure and thus increase the durability thereof. The invention further seeks to provide that the a design structure permitting the use of shock absorbers with a greater spring travel.

In accordance therewith the fingers of a closure member are mounted rotatably in their central portion and an outer portion which is passed outwardly through an opening in the container wall is mounted by way of an elbow lever mechanism in a further rotary mounting of the frame structure. In the closed position of the closure members the elbow lever mechanism is in the straight position, that is to say the two lever arms of that mechanism are in a straight line, so that control members which are pivotally connected to the elbow lever mechanism are decoupled from the path of the transmission of force by way of the extended elbow lever mechanism into the frame structure. In that arrangement associated with each grid bar is its own elbow lever mechanism. For joint actuation of the elbow lever mechanisms, either the lower or the upper lever arms of the elbow lever mechanisms of a closure member are connected together by a connecting member, preferably a beam or bar, which is pivotably engaged by a control member which is supported in a third rotary mounting of the frame structure. Preferably two control members are associated with the connecting member.

Preferably the fingers in the inclined position of the closure members are inclined obliquely downwardly, wherein a value of 30° has been found to be particularly desirable as the angle of inclination relative to the horizontal, having regard to the shock loading and the aspect of sealing off the exit openings for the fingers. From that closed position, the fingers are moved through 60° downwardly into the release position in which they are substantially aligned with the shaft walls disposed thereabove.

When the fingers are inclined obliquely downwardly, the retardation distance or travel is increased, in comparison with their horizontal arrangement. With an inclination of 30°, that is about 13%. In addition, the forces which act on the fingers are divided into a component perpendicular to the finger and a component parallel to the finger. For the critical flexural stress immediately in the vicinity of the first mounting, the component perpendicular to the finger is primarily crucial. With an angle of inclination of 30° a reduction in the flexural stress of about 13% is achieved.

Because of the force component which acts parallel to the finger on the impinging batch of scrap, the direction of the retardation travel or distance in relation to the center of gravity of the batch of sheet metal changes and thus also results in an increase in the length of the retardation travel or distance. Having regard to all components, it is possible in this way to achieve a reduction in the critical load by about 25%.

For the purposes of damping the shock forces, shock absorbers are provided either in the lower or in the upper lever arms of the elbow lever mechanisms. In addition, shock absorbers can be provided between the first rotary mountings of the fingers and the frame structure, in the case of high shock loadings. In that situation, the first rotary mountings are displaceable perpendicularly in guides of the frame structure and are supported on the frame structure by way of shock absorbers.

It has been found particularly advantageous for the fingers each to be mounted in a respective mounting housing which, together with the finger, forms a replaceable structural unit. In that way it is possible for individual fingers, together with their rotary mountings, to be replaced during operation of the assembly. In that case the mounting housings are preferably supported on the frame structure by way of individual shock absorbers.

BRIEF DESCRIPTION OF THE DRAWINGS

The invention is described in greater detail by means of embodiments with reference to 4 Figures of drawings in which:

FIG. 3 shows a portion of the assembly to illustrate the way in which a finger passes through the container wall, the first mounting being supported in this case on the frame structure by way of a shock absorber, and FIG. 4 is a perspective view of a part of the assembly showing a first mounting in the form of a replaceable unit, with a finger, in the installed condition.

DESCRIPTION OF THE PREFERRED EMBODIMENT

Figure 1:
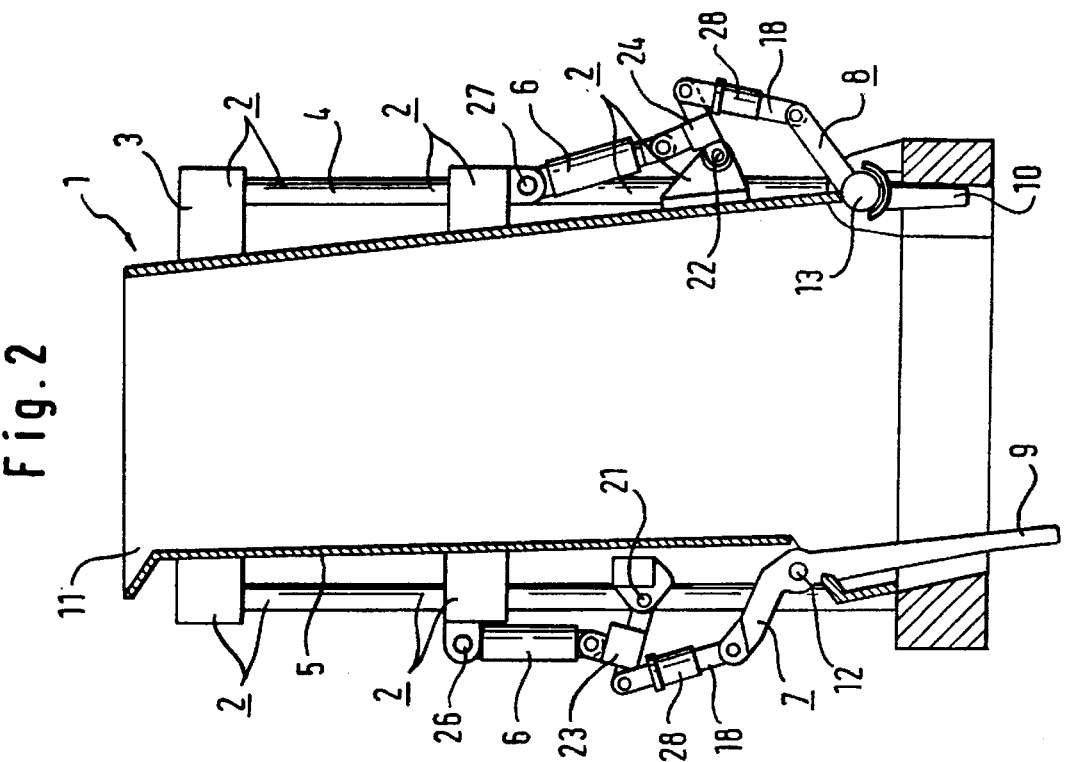
FIG. 1 is a diagrammatic view of a charging material preheater in which the fingers are in the closed position.
Figure 2:
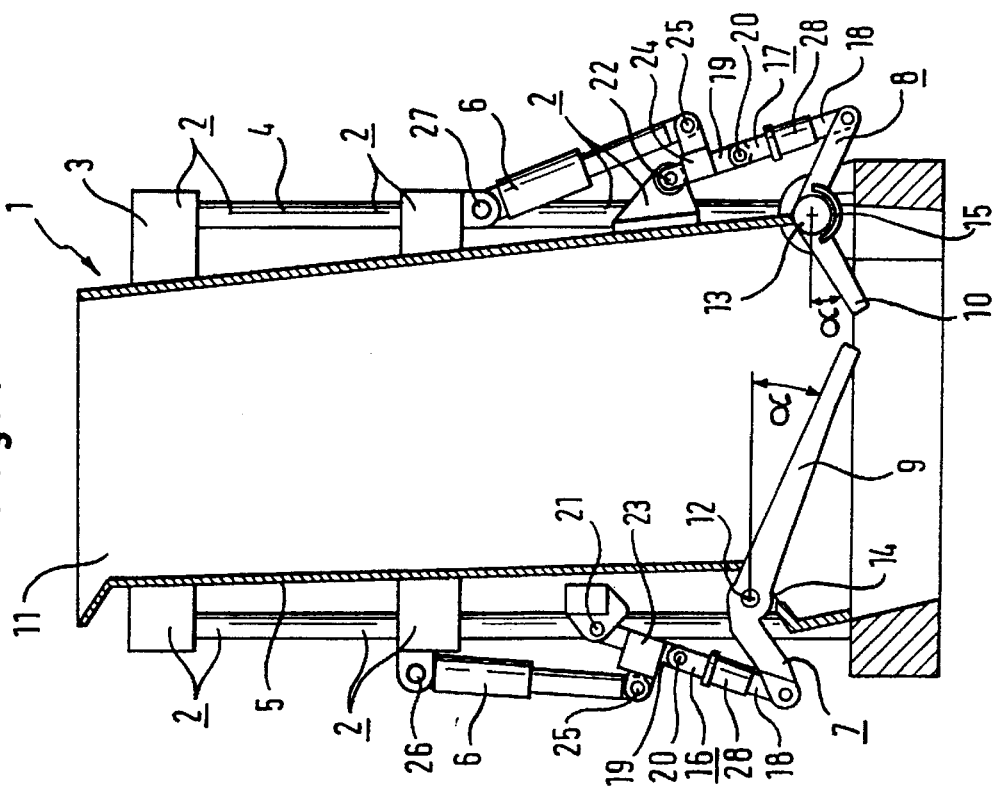
FIG. 2 is a view corresponding to FIG. 1 in which the fingers are in the release position.

The charging material preheater 1 shown in FIG. 2 includes a frame structure in the form of a parallelepipedic cage construction comprising horizontal beams or bars 3 and perpendicular pillars 4. Disposed within the frame structure 2 is a shaft 5 of approximately rectangular cross-section, the internal space of which is enlarged in a downward direction. Disposed in the lower region of the shaft 5 are mutually oppositely disposed closure members 7 and 8 which are pivotable by two control members 6 (only the front control member is visible in each case). The closure members have respective fingers 9 and 10 which are arranged parallel and at a spacing from each other. FIG. 1 shows a finger 9 of the first closure member 7 and a finger 10 of the second closure member 8. The other fingers are respectively disposed parallel thereto from the front wall (not shown) of the shaft to the rear wall 11 of the shaft, wherein the spacing between the individual fingers is so selected that, with the closure members 7 and 8 in the position shown in FIG. 1, the fingers 9 and 10 can retain in the shaft charging material which is introduced into the shaft 5 from above, while at the same time an adequate cross-section for heating gases to pass through between the individual fingers, for preheating the charging material, is guaranteed.

BRIEF DESCRIPTION OF THE DRAWINGS

Fingers 9 and 10 are respectively rotatably mounted in first rotary mountings 12 and 13 respectively. The rotary mounting can be in the form of a journal which is supported on the frame structure (see the mounting 12) or in the form of a mounting shell which is supported on the frame structure and which accommodates a rotary shaft on which the finger 10 or a group of fingers 10 is fixed (see the mounting 13).

It will be seen from FIG. 1 that the fingers 9 and 10 are mounted by a central portion in the first mounting 12 and 13 respectively and are each passed outwardly through an opening 14 and 15 respectively in the corresponding wall of the shaft, so that, in regard to each finger 9 and 10 respectively, there is defined an inner portion which projects into the internal space of the shaft and an outer portion which, in relation to the inner portion, is on the opposite side of the respective first rotary mounting.

The outer portion of the respective finger 9 and 10 is mounted in a second rotary mounting 21 and 22 respectively of the frame structure 2 by way of a respective elbow lever mechanism 16 and 17 respectively, each of which comprises a lower arm 18 and an upper arm 19 which are connected together by a hinge joint 20. In the present case, associated with each of the fingers 9 that are arranged in parallel relationship is a respective elbow lever mechanism 16. The same applies in regard to the fingers 10 which are arranged in mutually parallel relationship. It is however also possible for two or more fingers of a closure member to have a common elbow lever mechanism associated therewith. In the illustrated embodiment, for the purposes of joint actuation of all fingers 9 and 10 respectively of a closure member 7 and 8, the upper lever arms 19 of the elbow lever mechanisms 16 and 17 respectively of a closure member 7 and 8 are connected together by a connecting member, more specifically a respective beam or bar 23 and 24, and that beam or bar is engaged, by way of a joint 25, by the control member 6 which is supported at a third rotary mounting 26 and 27 respectively on the frame structure. In the present case the control member 6 is a hydraulic cylinder which, in the position shown in FIG. 1, is extended and thereby holds the elbow lever mechanism 16 and 17 in the extended position, that is to say in a position in which the two lever arms 18 and 19 are aligned with each other. With the elbow lever mechanism in that position, the fingers 9 and 10 respectively are in the closed position shown in FIG. 1. As can also be seen from the Figure, in this embodiment the second rotary mountings 21 and 22 are higher than the first rotary mountings 12 and 13 respectively and the third rotary mounting 26 and 27 are higher than the second rotary mountings 21 and 22 respectively.

In the illustrated embodiment, for the purposes of damping shocks which act on the fingers 9 and 10 when charging material is introduced into the shaft 5, due to the energy deriving from the downward falling movement thereof, shock absorbers 28 are provided in the lower arms 18 of the elbow lever mechanisms 16 and 17 respectively. When charging material impinges on the fingers, the shock absorbers 28 permit an angular movement of the inner portions of the fingers about the mountings 12 and 13 respectively, and in so doing damp the impact shock energy. The flexural loading on the fingers is substantially reduced in that way.

As, in the closed position of the closure members 7 and 8, the elbow lever mechanisms 16 and 17 respectively are in their straight or extended position, the shock forces which act on the fingers 9 and 10 when charging material is introduced are transmitted by way of the joints directly to the second mountings 21 and 22 respectively. The control members 6 are decoupled from the flow of forces.

For the reasons already mentioned, the fingers 9 and 10, in the closed position of the closure members as shown in FIG. 1, are inclined obliquely downwardly. An angle of inclination α of about 30° has been found to be advantageous. The outer portions of the fingers 9 and 10 respectively are angled downwardly. That measure serves to make optimum use of the available space, with the desired long damping travel or distance for the shock absorbers 28, and to ensure reliable actuation by the control members 6.

In the embodiment shown in FIG. 1 the inner portions of the fingers 9 are substantially longer than the inner portions of the fingers 10. This arrangement provides that, upon pivotal movement of the closure members 7 and 8 from the closed position shown in FIG. 1 into the release position shown in FIG. 2, the charging material in the shaft can be charged at one side, more specifically in the present case at one side towards the right. This is advantageous if the shaft of the charging material preheater is used in conjunction with a smelting plant in which it is mounted laterally in the cover region, because in that way it is possible for the material to be charged towards the center of the vessel.

FIG. 2 shows the release position of the closure members 7 and 8. The closure members are moved from the closed position shown in FIG. 1 into the release position by the control members 6 being moved from the extended position into the retracted position, whereby the upper lever arms 19 of the elbow lever mechanisms 16 and 17 are raised by way of the beams or bars 23 and 24 respectively, and thus the fingers 9 and 10 are pivoted about their first mountings 12 and 13 respectively until their inner portions face approximately vertically downwardly, so that the passage for material through the shaft is opened. In that situation the pivot angle is about 60°.

In a modified embodiment, the portion of structure shown in FIG. 3 illustrates the mounting of a finger in a finger housing 29 which is supported on the frame structure 2 by way of a shock absorber 30. The first rotary mounting 12 in which a journal 31 of the finger 9 is mounted is provided in side walls of the finger housing 29. The finger housing also has cooling ducts 32 and 33 at the locations which are towards the opening 14 in the wall of the shaft 5. Conduits 34 and 35 are provided for supplying the cooling ducts 32 and 33 with cooling water. The conduits 34 and 35 are connected to cooling water ducts which are present in the frame structure 2. The portion of the finger housing 29, which faces towards the interior of the shaft and which defines the cooling water duct 32, is provided at the underside with an edge 36 which serves to break slag deposits. The Figure shows the release position of the finger 9.

In the event of a shock loading on the finger 9 the finger housing 29 is moved perpendicularly downwardly and, when that happens, the shock energy acting on the first mounting 12 is damped by the shock absorber 30.

FIG. 4 is a perspective view of a portion of structure corresponding to that shown in FIG. 3, but in this case the shock absorber 30 is integrated into the finger housing 29.

Just as in the preceding embodiment, the first rotary mounting 12 is fixedly arranged in the finger housing 29 which is supported on the frame structure 2 by way of the shock absorber, by means of a pull rod 36 and connecting elements 37. Disposed on both sides of the finger housing 29 are guide walls 38 which are fixedly connected to the frame structure 2 and of which FIG. 4 shows only the rear guide wall. At the sides which are towards the guide walls 38 the finger housing 29 is provided with slide projections or keys 39 which are guided between guide bar portions 40 mounted on the guide walls 38. In that way, in the event of a shock loading, the finger housing is forced to move vertically, utilising the damping action of the shock absorber.

As can be seen from FIG. 4, the finger housing 29, together with the finger 9 mounted in the finger housing, is in the form of a replaceable structural unit which permits replacement of a finger while the charging material preheater is in operation.

We claim:

1. A charging material preheater liar preheating charging material for metallurgical smelting plant, said charging material preheater comprising
    a shaft fixed in a frame structure and having a wall, a lower region and an internal space, and in the lower region having mutually oppositely disposed closure members each of which is pivotable by a control member,
    said closure members including parallel fingers mounted in a first rotary mounting supported on the frame structure, and
    said closure members being pivotable downwardly between
        a closed position in which the inner portion of each of said fingers projects into the internal space of the shaft to retain charging material in the shaft and
        a release position in which the inner portion of each of said fingers faces downwardly and to release the charging material from the shaft,
    wherein
        each of said fingers is mounted by its central portion in the first rotary mounting
        each of said fingers is mounted by its outer portion in a second rotary mounting on the frame structure
        said outer portion of each finger is passed outwardly through an opening in the shaft wall by way of an elbow lever mechanism having lower and upper lever arms which are connected together by a hinge joint, and
        the lower or the upper lever arms of at least two elbow lever mechanisms are connected together by a connecting member which is pivotably engaged by an control member supported in a third rotary mounting of the frame structure.

2. A charging material preheater according to claim 1 wherein in the closed position of the closure members the elbow lever mechanisms are in their extended position when the closure members are in the closed position.

3. A charging material preheater according to claim 1 wherein of the rotary mountings associated with a closure member, the second rotary mounting is arranged above the first and the third rotary mounting is arranged above the second.

4. A charging material preheater according to claim 1 wherein the frame structure is in the form of a parallelepipedic cage construction having horizontal beams and vertical pillars.

5. A charging material preheater according to claim 1 wherein shock absorbers are provided in at least one of the lower and the upper lever arms of the elbow lever mechanisms.

6. A charging material preheater according to claim 1 wherein the inner portions of the fingers are inclined obliquely downwardly in the closed position of the closure members.

7. A charging material preheater according to claim 1 wherein the angle of rotation of the inner portions of the fingers from the closed position into the release position is in the range of 55° through 65°.

8. A charging material preheater according to claim 1 wherein the inner portions of the fingers of the one closure member are longer than the oppositely disposed inner portions of the fingers of the second closure member.

9. A charging material preheater according to claim 1 wherein in the case of at least some of the fingers, the outer portions are angled downwardly relative to the inner portions.

10. A charging material preheater according to claim 1 wherein the first rotary mounting is supported on the frame structure by a shock absorber.

11. A charging material preheater according to claim 1 wherein each finger is mounted in its own mounting housing which carries the first rotary mounting for the respective finger and which together with the finger forms a replaceable structural unit.

12. A charging material preheater according to claim 11 wherein the mounting housing is supported on the frame structure by a shock absorber.

13. A charging material preheater according to claim 11 wherein the mounting housing is displaceable perpendicularly between guide walls which are fixed to the frame structure.

* * * * *